United States Patent Office 3,161,606
Patented Dec. 15, 1964

3,161,606
POLYETHYLENE NEUTRON SHIELD CONTAINING DISPERSED BORIC OXIDE
Donald E. Rash, Kingsport, Tenn., assignor to Eastman Kodak Company, Rochester, N.Y., a corporation of New Jersey
No Drawing. Filed Aug. 11, 1960, Ser. No. 48,810
11 Claims. (Cl. 252—478)

This invention concerns a polyethylene neutron shield and more particularly a method of producing a polyethylene neutron shield.

Various polymeric materials have been used for shields against X-rays and the like such as methyl methacrylate, phenol-formaldehyde type resins and the like. However, it has been desirable to prepare a shield against neutron flux using polyethylene or another suitable polymeric material by incorporating a boron compound in the polyethylene. Inasmuch as elemental boron is prohibitive in cost, a boron derivative can be employed such as boric oxide. However, boric oxide is hygroscopic and, therefore, extremely difficult to incorporate into a polymer such as polyethylene without picking up some moisture. This results in a non-uniform product, full of voids and hard crystalline masses which cannot be further dispersed by conventional methods.

I have found a method of dispersing boric oxide which does not disadvantageously affect the characteristics of polymers such as polyethylene and which results in a satisfactory neutron shield.

One object of this invention is to provide a means of easily incorporating boric oxide with polyethylene so that a uniform product is obtained which is completely free from agglomerates or visible particles of boric oxide. Another object is to provide material with neutron shielding properties and extrusion properties which are superior to boric oxide-polyethylene compositions obtained without using this method.

Boric oxide or its 1-, 2- or 3-hydrate is combined with a polyhydric alcohol such as glycerol and the resulting mixture blended into the polyethylene or similar polymer. Our preferred weight ratio of glycerol used is 0.33–3.75 parts of glycerol to one part of boric oxide used, based on anhydrous boric oxide. Two to eighteen percent of boric oxide (based on the anhydrous boric oxide) is incorporated in the polymer based on the total amount of the polymeric material.

Specifically, in our preferred embodiment, one part by weight of glycerol is added to three parts of boric oxide in a polyethylene bag. This mixture is kneaded until a thick paste is formed, to prevent any liquid glycerol from being lost in the mixer. This thick paste is then added, still in the bag, to polyethylene in a Banbury mixer, mixed until a homogenous mixture is formed, and then dumped into a milling roll or into an extruder and cut into pellets from the strip that is taken from the roll or extruder. The resulting material is very uniform and appears to be a solid solution. No visible specks of boric oxide are observed and no apparent exudation of glycerol is noted. In the event that a glycerol is used, our preferred embodiment would be 0.25 to 2.83 moles/mole boric oxide. If a different polymer were used, the polymeric bag would be substituted for the polyethylene bag so that the same material would be used for the bag as is being used to make the neutron shield.

The proportions are relatively critical since if an excess of polyhydric alcohol is used, it will exude from the surface of the material. The processing temperature for incorporating boric oxide in polyethylene would naturally have to be greater than the melt temperature of the polyethylene, but should be less than the boiling point of the polyhydric alcohol, less than 554° F. which is the boiling point of glycerol in the event that glycerol is the polyhydric alcohol used.

Polyhydric alcohols which may be used include those having two to ten carbon atoms. However, Carbowax 400 which is a glycolether with a molecular weight range of 380–420 has been used successfully. Adjacent hydroxyl groups are not necessary, but 1,6-hexanediol, for instance, is as satisfactory as ethylene glycol.

The following examples are intended to illustrate my invention but not to limit it in any way.

*Example 1*

2200 grams (84.44%) polyethylene
230 grams (8.84%) glycerol, USP, 95.0%
175 grams (6.71%) boric oxide, anhydrous, 200 mesh
0.23 gram (0.009%) Du Pont Oil Red Dye (Colour Index No. 258)

The glycerol was heated to 140° C. and the boric oxide and the dye added slowly, with stirring, until a solution was formed. The solution, upon cooling, formed a sticky, hard plastic mass. It was then added to the polyethylene in a size 00 Banbury mixer, mixed for five minutes at approximately 104° C., and then transferred to a 42-inch milling roll where it was stripped off and cut into pellets. Plates pressed from the pellets showed that the material contained no visible specks of boric oxide. No exudation of glycerol from the plate has been noted. The melt viscosity (ASTM D–1238–52T) of the final material was 2.1.

*Example 2*

172 grams (84.99%) polyethylene
14 grams (7.50%) glycerol, USP, 95.0%
14 grams (7.50%) boric oxide, anhydrous, 200 mesh
0.02 gram (0.01%) Du Pont Oil Red Dye (Colour Index No. 258)

The boric oxide and dye were added to the glycerol in a polyethylene bag and kneaded until a thick paste was formed. The polyethylene was blended on a 24-inch milling roll at approximately 130 to 140° C., and the bag containing the glycerol-boric oxide-dye paste was added and the material rolled for three minutes. A plate pressed from this material showed that it was uniform, with no visible specks of boric oxide present.

*Example 3*

4.4 pounds (84.99%) polyethylene
175 grams (7.50%) glycerol, USP, 95.0%
175 grams (7.50%) boric oxide, anhydrous, 200 mesh
0.23 gram (0.01%) Du Pont Oil Red Dye (Colour Index No. 258)

The dye, boric oxide, and glycerol were placed in a polyethylene bag and made into a paste, as described in Example 2 above. The natural polyethylene was first fluxed in a size 00 Banbury mixer, and then the bag containing the paste was added and the mixture allowed to mix for five minutes. The mixture was then transferred to a 42-inch milling roll and rolled and pelleted without running the strip through water. Eight batches were made in this manner, and the pellets immediately sealed in natural polyethylene bags. Plates pressed from the pellets showed excellent dispersion, with no visible specks present. The melt viscosity of the material was 1.7.

A portion of the pellets was extruded on a 1½-inch extruder with a 1¼ x ⅛-inch strip die. Extrusion temperatures were 410, 450, and 350° F. for the die and front and back sections of the barrel, respectively. The material extruded very well and formed a smooth, uniform strip with no voids or specks. However, the extrudate started bubbling when the temperature of the barrel approached 550° F.

*Example 4*

4.65 pounds (90.00%) polyethylene
175 grams (7.50%) boric oxide, anhydrous, 200 mesh
58 grams (2.49%) glycerol, USP, 95.0%
0.23 gram (0.01%) Du Pont Oil Red Dye (Colour Index No. 258)

This sample was made with a size 00 Banbury mixer and a 42-inch milling roll, as described in Example 3 above. Plates pressed from the pellets showed excellent dispersion, with no visible specks of boric oxide.

Six more batches of this material were made December 22, 1959. A sample was extruded through the 1¼ x ⅛-inch strip die on the 1½-inch extruder with the die and the front and back sections of the barrel at 410, 450, and 350° F., respectively. The extruded strip was excellent, with no voids or specks.

*Example 5*

264 pounds (94.40%) polyethylene
11.20 pounds (4.00%) boric oxide, anhydrous, 200 mesh
4.20 pounds (1.50%) glycerol
127 grams (0.10%) Du Pont Oil Yellow Dye (Colour Index No. 17)

The dye, boric oxide, and glycerol were placed in a polyethylene bag and made into a paste, as described previously. The bag containing the paste was added with natural polyethylene pellets to a size 9D Banbury mixer and mixed for six minutes. The resulting homogeneous mixture was dumped into a 12-inch Farrel-Birmingham extruder, extruded into a strip under water, and cut into pellets. Plates pressed from the pellets again showed excellent dispersion, with no visible specks. A sample of the pellets was extruded through the 1¼ x ⅛-inch strip die on the 1½-inch extruder with the die and the front and back sections of the barrel at 400, 400, and 300° F., respectively. The extruded strip was again excellent, but bubbles appeared in the extrudate when the temperature of the barrel was increased to 450° F.

Other polymeric materials which may be used include those which are not affected by acidic compounds. Cellulosic materials such as ethyl cellulose, cellulose acetate and the like are not operative since they tend to disintegrate when boric oxide or boric acid is incorporated. However, polyolefins such as polyethylene and polypropylene can be used as well as polyesters, polyamides, polycarbonates, chlorinated polyethers, polyacetals, polytetrafluoroethylene, polychlorotrifluoroethylene and the like.

Polyethylene having boric oxide dispersed therein in accordance with my invention can be compression rolled and stress set in accordance with the method described in the Williams et al. U.S. patent application Serial No. 9,567, now abandoned, filed February 18, 1960.

The invention has been described in detail with particular reference to preferred embodiments thereof, but it will be understood that variations and modifications can be effected within the spirit and scope of the invention as described hereinabove and as defined in the appended claims.

I claim:

1. A neutron shield comprising a polyolefin having incorporated therein a complex of glycerol and boric oxide in the ratio of 1 mole boric oxide to 0.33–3.75 moles glycerol, said complex being present in the polyolefin in sufficient quantity to render the polyolefin resistant to penetration by neutron radiation.

2. Claim 1 wherein the polyolefin is polyethylene.

3. Claim 1 wherein the polyolefin is polypropylene.

4. A neutron shield comprising a polyolefin having incorporated therein a complex of boric oxide and a polyhydric alcohol having 2–10 carbon atoms, said complex containing a ratio of 1 mole of said boric oxide to 0.25–3.75 moles of said polyhydric alcohol, and said polyolefin containing a sufficient quantity of said complex to render said polyolefin resistant to penetration by neutron radiation.

5. Claim 4 wherein the polyolefin is polyethylene.

6. Claim 4 wherein the polyolefin is polypropylene.

7. A process of dispersing boric oxide in a polyolefin comprising mixing 0.25–3.75 moles of a polyhydric alcohol having 2–10 carbon atoms with 1 mole boric oxide to form a complex, and blending said complex with said polyolefin to form a homogenous mixture.

8. The process of claim 7 wherein the polyolefin is polyethylene.

9. The process of claim 7 wherein the polyolefin is polypropylene.

10. The process of dispersing boric oxide in polyethylene which comprises mixing 0.33–3.75 parts by weight glycerol with 1 part by weight boric oxide in a polyethylene bag to form a complex, kneading the mixture to form a thick paste and blending the paste with polyethylene to form a homogeneous mixture.

11. The process of dispersing boric oxide in polypropylene which comprises mixing 0.33–3.75 parts by weight glycerol with 1 part by weight boric oxide in a polypropylene bag to form a complex, kneading the mixture to form a thick paste and blending the paste with polypropylene to form a homogeneous mixture.

References Cited by the Examiner

UNITED STATES PATENTS

| | | | |
|---|---|---|---|
| 2,489,226 | 11/49 | Morris et al. | 260—41 |
| 2,808,384 | 10/57 | Gerbel et al. | 260—33.4 |
| 2,857,347 | 10/58 | De Groot et al. | 260—41 |
| 2,961,415 | 11/60 | Axelrad | 176—88 X |
| 2,998,523 | 6/61 | Erskine et al. | 252—478 |
| 3,014,885 | 12/61 | Jordan et al. | 260—41 |
| 3,053,776 | 9/62 | Borst | 252—478 |

OTHER REFERENCES

Rockwell: Reactor Shielding Design Manual, November 1956, pp. 175–177, McGraw-Hill Book Co., Inc.

CARL D. QUARFORTH, *Primary Examiner.*

LEON D. ROSDOL, *Examiner.*